(12) United States Patent
Erwin

(10) Patent No.: US 6,527,469 B1
(45) Date of Patent: Mar. 4, 2003

(54) MOUNTING BRACKET FOR RAILING

(75) Inventor: Ronald D. Erwin, Fayetteville, GA (US)

(73) Assignee: Erwin Industries, Inc., Peachtree City, GA (US)

( * ) Notice: Subject to any disclaimer, the term of this patent is extended or adjusted under 35 U.S.C. 154(b) by 0 days.

(21) Appl. No.: 09/570,259

(22) Filed: May 12, 2000

(51) Int. Cl.[7] .................................................. F16B 9/00
(52) U.S. Cl. ........................... 403/192; 256/65; 256/1
(58) Field of Search ................................ 403/187, 188, 403/192, 199; 256/59, 65, 66, 1

(56) References Cited

U.S. PATENT DOCUMENTS

| | | | |
|---|---|---|---|
| 5,029,820 A | * | 7/1991 | Katz .............................. 259/59 |
| 5,121,891 A | * | 6/1992 | Goldsmith .............. 403/199 X |
| 5,788,224 A | | 8/1998 | Platt |
| 5,873,671 A | * | 2/1999 | West .......................... 256/65 X |
| 6,017,019 A | | 1/2000 | Erwin |

* cited by examiner

Primary Examiner—Lynne H. Browne
Assistant Examiner—John R. Cottingham
(74) Attorney, Agent, or Firm—Gardner Groff & Mehrman, P.C.

(57) ABSTRACT

A bracket for attaching a rail to a post. The bracket comprises a means for attaching said bracket to a post and means to provide said bracket with added support. Preferably, the bracket is bread shaped to fit a specific rail style well-known in the art. The bracket further comprises flanges to allow the bracket to be fastened to upright posts. The flanges are adapted to provide against vertical movement and against lateral movement through their opposing locations and their angled surface. Additionally, the bracket comprises an extended base to provide increased strength in response to force exerted on the attached rail.

11 Claims, 2 Drawing Sheets

MOUNTING BRACKET FOR RAILING

TECHNICAL FIELD

The present invention relates generally to brackets and, more specifically, to a rail bracket which fastens a rail to a post.

BACKGROUND OF THE INVENTION

Outdoor decks are extremely popular in residential home construction. Homes and apartments, as well as a variety of other buildings, often incorporate exterior decks into their design. Additionally, decks are commonly added onto existing structures and landscapes. These decks provide convenient spaces for a variety of outdoor activities, including cookouts, dining and sunbathing, as well as other leisure activities. Moreover, decks typically are provided with a railing or perimeter fence to keep people from falling over the edge of the deck.

Wood products traditionally have been the primary source of materials for use in decking and fence construction. However, wood products are becoming increasingly scarce due to the harvesting of trees at ever faster rates and the rather limited rate at which timber resources can be replenished. Also, environmental concerns and regulations directed to conservation or preservation of forests tend to restrict the availability of wood products. With the diminishing availability of timber resources, wood products are becoming increasingly expensive. There is, therefore, a substantial need for long-lasting substitute construction materials that can lessen the need to harvest timber resources.

One potential approach to addressing the above need is to provide substitute fence and decking products made of plastic, rather than wood. However, because the deck products must be capable of sustaining certain loads, the replacement products need to be stable and rigid. The material should also be capable of economical manufacture and be relatively inexpensive. It also needs to be installed and used in the field easily.

A variety of plastic building products are known. For example, U.S. Pat. No. 4,045,603 describes a three-layer synthetic construction material made from recycled waste thermoplastic synthetic resin material and cellulose fiber aggregate. This material includes face surfaces consisting essentially of re-hardened fused and rolled thermoplastic synthetic resin material bits, and an intervening core material consisting essentially of a compressed non-homogenous mixture of cellulose aggregate material bits and re-hardened fused thermoplastic synthetic resin material bits.

Some of the essential elements of deck and fence construction are the railing and post members. The railing is typically bread-shaped and secured to the post via a bracket. Traditional brackets, however, often are unattractive, are cumbersome to use, and often do not adequately remain flush with the post. U.S. Pat. No. 5,788,224 describes a rail attachment system having a bracket for receiving the end of a rail and a clip mounted to the post, with the clip in turn then supporting the mounting bracket.

A need yet remains in the art for a bracket that can adequately secure and support a rail to a post, has an esthetically pleasing appearance and can be used quickly and easily. It is to the provision of such a bracket that the present invention is primarily directed.

SUMMARY OF THE INVENTION

Briefly described, in a first preferred form the present invention both overcomes the above-mentioned disadvantages and meets the recognized need for such a device, by providing a one-piece modular composite rail bracket for attaching a railing to a post.

Generally, the present device is a one-piece modular composite bracket, further comprising means for attaching said bracket to a post and means to provide said bracket with added support. In the preferred embodiment, the bracket preferably is bread-shaped to fit a specific common style of rail well-known in the art. Within the scope of the present device, it should be understood that the bracket could be a different shape or style, depending on the shape of the corresponding railing.

Preferably, the bracket includes flanges having angled throughholes to allow the bracket to be fastened to an upright post. The flanges are an integral part of the one-piece bracket and are located on opposing exterior sides of the bracket to facilitate access for installation and removal. Additionally due to their opposing locations, the flanges provide both vertical and lateral support to reduce rotation of the bracket when fastened to the post.

Also preferably, the bracket includes an extended outrigger to provide increased strength in response to force exerted on the attached handrail. This extended outrigger is an integral part of the one-piece bracket and extends from the base of the bracket.

Preferably, the throughholes are formed in ears located in opposite recesses in the sides of the bread-shaped profile. Also preferably, the ears and the outrigger are faired or eased to minimize them visually without sacrificing much, if any, strength.

An object of the present invention is to provide an elongated one-piece bracket to attach a railing to a post.

A further object is to provide a one-piece bracket which securely retains a rail to a post, is easily installed, is strong and sturdy, and is weather resistant.

Another object of the invention is to provide a bread-shaped bracket to fit a bread-shaped rail style well-known in the art.

A further object of the invention is to provide such a bracket which allows easy installation and removal.

Another object of the present invention is to provide such a bracket having decreased screw/nail visibility.

Still a further object of the invention is to provide such a bracket with increased strength in response to forces exerted on the attached handrail, for better maintaining a flush positioning of the bracket against the post.

These objects, advantages and features of the present invention will become more apparent upon reading the following specification in conjunction with the accompanying drawing figures.

BRIEF DESCRIPTION OF THE DRAWING FIGURES

The present invention will be better understood by reading the Detailed Description of the Preferred Embodiment with reference to the accompanying drawing figures, in which.

DETAILED DESCRIPTION OF THE PREFERRED EMBODIMENT

In describing the preferred and alternate embodiments of the present invention, specific terminology is employed for the sake of clarity. The invention, however, is not intended to be limited to the specific terminology so selected.

Figure 1:
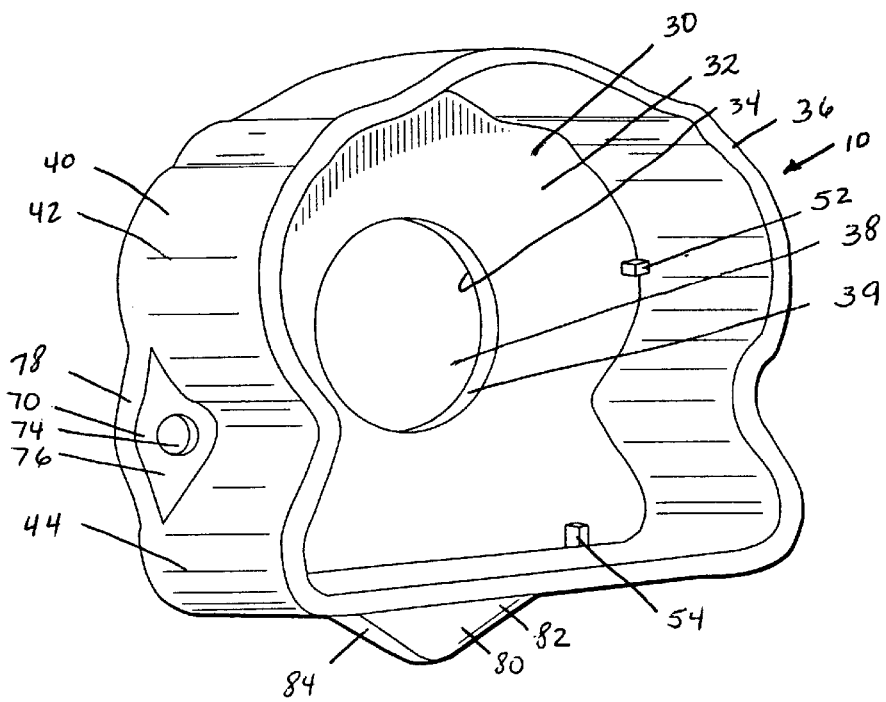
FIG. 1 is a perspective view of the one-piece bracket according to a preferred embodiment of the invention.

Referring now in detail to the drawing figures, wherein like reference numerals represent like parts throughout the several views, FIG. 1 shows a one-piece bracket 10 according to a preferred form of the invention. The bracket 10 preferably comprises a substantially flat rear panel 30 and a peripheral wall 40, the flat rear panel having a front surface 32 and a rear surface 34. The panel 30 comprises a centrally located circular opening 38 which is of increasing circumference from front surface 32 to rear surface 34, creating angled inner surface edge 39 within circular opening 38. The circular opening 38 allows electrical cables or reinforcing elements (such as a metal pipe) to be run through the rail. The peripheral wall 40 extends outwardly from front surface 32 of panel 30 thereby defining a rail receptacle 36 between the panel 30 and the peripheral wall 40. The peripheral wall 40 comprises an upper outwardly curved area 42 and a lower outwardly curved area 44.

In the preferred form, the bracket 10 is bread-shaped (or "bread-loaf shaped"), similar to the cross-sectional configuration of a specific rail style well-known in the art, to allow the end of a fence rail to fit securely within the rail receptacle 36.

An upper tab (spacer) 50 extends outwardly from the front surface 32 of the panel 30 and is located centrally along the top inner surface of the peripheral wall 40. A side tab (spacer) 52 extends outwardly from the front surface 32 of the panel 30 and is located centrally within each opposing upper curved portion 42 of the peripheral wall 40. A lower tab (spacer) 54 extends outwardly from the front surface 32 of the panel 30 and is located along the bottom inner surface of the peripheral wall 40 on each peripheral side of the support base 80. Spacers 50, 52, and 54 form a small gap between the rail and the panel 30 thereby preventing the rail from resting flush thereagainst and thus allowing trapped moisture to escape.

The bracket 10 further comprises side flanges or fastener bosses 70 and 72 which are provided to be placed flat against the post face for mounting thereto. In this regard, the flanges 70 and 72 each extend from, are an integral part of rear panel 30. The flanges include a rear surface which is flush with the rear surface 34 of panel 30. The flanges 70 and 72 include a rearwardly angled front surface 76 and 77, respectively, which extends at an angle from the inwardly curved outer surface of wall 40 toward an outwardly curved flange edge 78. Flange edge 78 spans the area between the upper and lower outwardly curved areas 42 and 44, respectively, of outer surface of wall 40 and extends from the angled front surface 76 and 77, respectively, to rear surface 34. Each flange includes an angled mounting hole 74, 75 for receiving a screw, bolt, rivet or nail therethrough for fastening the bracket 10 to the upright post. The angled mounting holes 74, 75 are formed at an angle directed away from the peripheral wall 40 to ensure that the peripheral wall 40 does not interfere with the head of the screw, bolt, nail or rivet and/or the installation tool. This protects the bracket 10 from damage during installation. Flanges 70 and 72 are located on both exterior sides of the bracket to allow for ease in access for installation and removal and to provide against vertical movement and against lateral movement through their opposing locations and their angled surfaces.

The fastener bosses or flanges 70 and 72 are positioned at recesses in the sides of the mounting bracket 10. By placing the bosses at this location, the appearance of the bosses is rather minimized. In this regard, the angled or faired surface of these fastener flanges also helps to minimize the visual impact of these fastener flanges.

Figure 2:
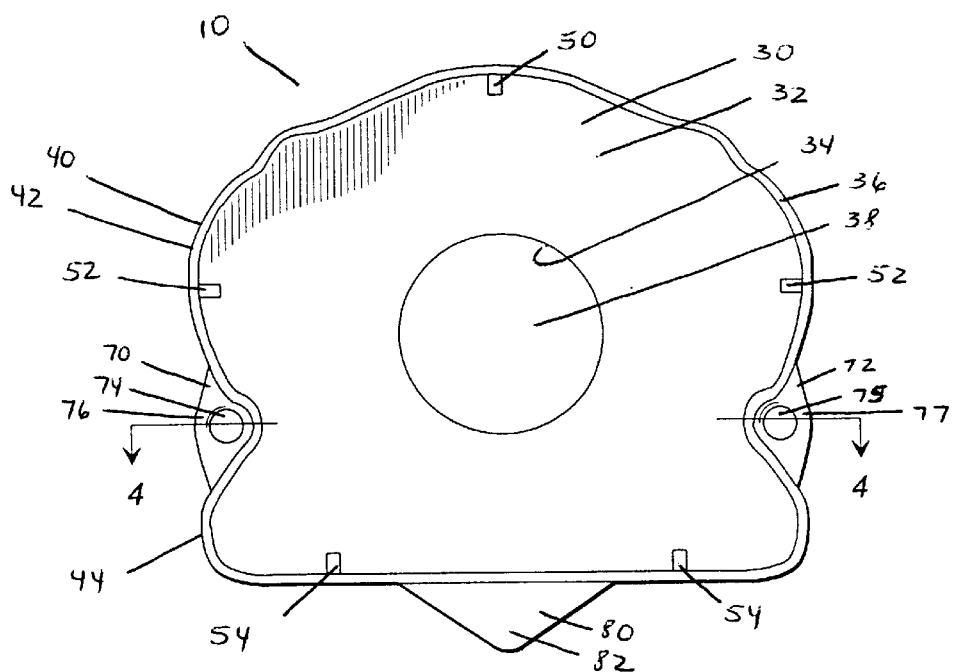
FIG. 2 is a front elevational view of the bracket of FIG. 1.
Figure 3:
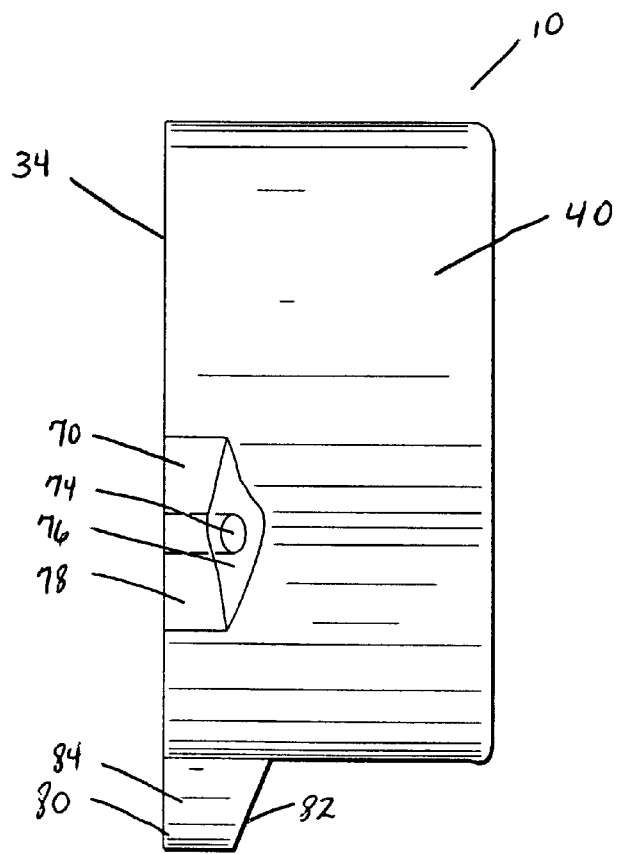
FIG. 3 is a side elevational view of the bracket of FIG. 1.
Figure 4:
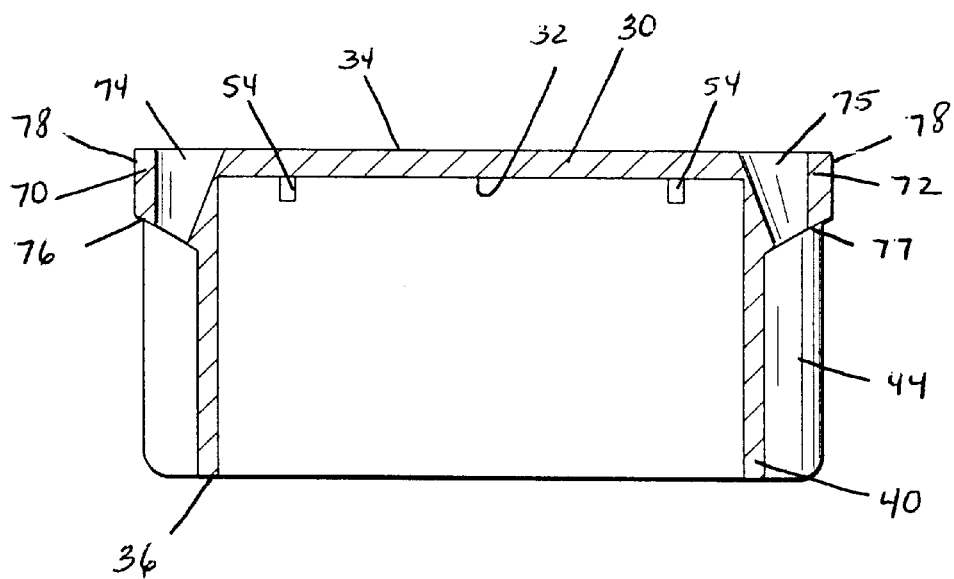
FIG. 4 is a sectional view taken along line 4—4, FIG. 2.

As a further feature of the invention, bracket 10 comprises an extended triangular outrigger 80 (FIGS. 1–3) to provide increased strength and stability in response to forces exerted on the attached rail. The outrigger 80 extends from and is an integral and flush part of the panel 30. The outrigger 80 includes a triangular-shaped rearwardly angled front surface 82 which extends at an angle from the bottom outer surface of the peripheral wall 40 to an outwardly curved edge 84. The outrigger edge 84 is centrally located on the bottom outer surface of the peripheral wall 40, forms a triangular shape, and extends from the angled front surface 82 toward rear surface 34.

In an alternative embodiment, the outrigger 80 has an aperture therethrough for receiving a nail, screw, bolt or other securing member, thus providing additional means for securing the bracket 10 to a post. In the preferred form, flanges 70, 72 and outrigger 80 are arranged in a triangular pattern, thereby providing a 3-point stabilizing arrangement. The outrigger 80 and the flanges 70, 72 may be extended to provide added support.

In an alternative embodiment, the bracket 10 could be formed without panel 30.

In an alternative embodiment, the bracket 10 could be formed without the tabs 50, 52 and 54.

In an alternative embodiment, the bracket 10 could be formed without the centrally located circular opening 38 in the panel 30.

In an alternative embodiment, the bracket 10 could be formed from more than one piece.

Also contemplated is that the bracket 10, the outrigger 80 and the flanges 70, 72 could be of varied shapes to complement a variety of rail cross-sections and the outrigger 80 and the flanges 70, 72 could be of increased size to provide additional support.

Having thus described the preferred forms of the present invention, those skilled in the art will additionally recognize that the within disclosures are exemplary only, and that various other alternatives, adaptations, and modifications may be made within the spirit and scope of the present invention as set forth in the following claims.

What is claimed is:

1. A bracket for use with fasteners in forming a railing by attaching a rail to a post, comprising:
   a panel;
   a peripheral wall securely attached to and extending forwardly from said panel, said peripheral wall defining a rail receptacle for receiving an end of the rail;
   fastener bosses positioned along said peripheral wall for fastening said bracket to the post; and
   an outrigger distinct from said fastener bosses and extending downwardly from said peripheral wall for partially bracing said bracket.

2. The bracket of claim 1, wherein said panel comprises a centrally located opening.

3. The bracket of claim 1, wherein said bracket is formed as a single piece.

4. The bracket of claim 1, wherein said panel further comprises a plurality of spacers extending outwardly from said front surface of said panel, wherein said spacers provide a gap between said panel and the end of the rail when inserted therein.

5. The bracket of claim 1, wherein said fastener bosses are formed in recesses of said peripheral wall.

6. The bracket of claim 5, wherein said fastener bosses comprise two fastener bosses, symmetrically located on opposing sides of said peripheral wall.

7. The bracket of claim 6, wherein each of said fastener bosses comprises a front surface which is angled relative to said panel.

8. The bracket of claim 1, wherein said bracket is bread shaped.

9. A one-piece bracket for use with fasteners in forming a railing by attaching a rail to a post, comprising:

a panel;

a peripheral wall securely attached to and extending forwardly from said panel, said peripheral wall defining a rail receptacle for receiving an end of the rail;

fastener flanges attached to said panel or said peripheral wall for attaching said bracket to the post using the fasteners; and a stabilizing foot extending downwardly from said peripheral wall and distinct from said fastener flanges for bracing said bracket.

10. The bracket of claim 9, wherein said fastener flanges define a mounting throughhole for receiving a fastener.

11. The bracket of claim 9, wherein said stabilizing foot defines an aperture therethrough for receiving a fastener.

* * * * *